(12) United States Patent
Artola et al.

(10) Patent No.: US 7,526,301 B2
(45) Date of Patent: *Apr. 28, 2009

(54) METHOD AND DEVICES FOR ROUTING A MESSAGE TO A NETWORK SERVER IN A SERVER POOL

(75) Inventors: Aitor Artola, Bilbao (ES); Aldo Baserga, Tavernerio (IT); Mauro Bellora, Gallarate (IT); Klaus Turina, Backnang (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 112 days.

This patent is subject to a terminal disclaimer.

(21) Appl. No.: 11/610,347

(22) Filed: Dec. 13, 2006

(65) Prior Publication Data

US 2007/0142043 A1 Jun. 21, 2007

Related U.S. Application Data

(63) Continuation of application No. 10/469,360, filed as application No. PCT/EP02/02147 on Feb. 28, 2002, now Pat. No. 7,171,207.

(30) Foreign Application Priority Data

Mar. 2, 2001 (EP) ................................. 01105099

(51) Int. Cl.
*H04B 1/06* (2006.01)
(52) U.S. Cl. .................. 455/466; 455/445; 455/517; 455/525; 370/351; 370/357; 370/389
(58) Field of Classification Search ................. 455/466, 455/445, 517, 525, 560; 370/351, 357, 389, 370/392
See application file for complete search history.

(56) References Cited

U.S. PATENT DOCUMENTS

| 6,091,953 | A | * | 7/2000 | Ho et al. ...................... 455/433 |
| 6,449,474 | B1 | * | 9/2002 | Mukherjee et al. ........ 455/414.2 |
| 6,622,019 | B1 | * | 9/2003 | Shalem et al. .............. 455/445 |
| 2004/0185854 | A1 | | 9/2004 | Artola | |

\* cited by examiner

Primary Examiner—Alexander Eisen
Assistant Examiner—Julio R Perez
(74) Attorney, Agent, or Firm—Michael Cameron

(57) ABSTRACT

Method, devices and computer programs for routing a message to a first network server (MSC1) in a server pool (CNSP) of a mobile communication system are disclosed. The mobile communication system comprises a controller (BSC2) of an access network (AN) connectable to the first network server (MSC1) and at least one further network server (MSC2) in the server pool (CNSP), wherein service points are defined (S100) and one or more of the service points are allocated (S110) uniquely to each of the network servers (MSC1, MSC2) in the server pool (CNSP). At least one of the network servers (MSC1, MSC2) has allocated (S110) at least two of the service points. A temporary identity is assigned (S150) by the first network server (MSC1) to a mobile device (MS). The temporary identity includes a selected service point which is selected (S140) from the one or more service points allocated to the first network server (MSC1). The temporary identity is transmitted (S160) to the mobile device (MS) and a message (S170) from the mobile device (MS) to the first network server (MSC1) is routed (S200) to the first network server (MSC1) by extracting the selected service point from the temporary identity received by the mobile device (MS) and applying a routing algorithm to the selected service point. The routing algorithm reveals the first network server (MSC1) from an analysis of the selected service point.

29 Claims, 9 Drawing Sheets

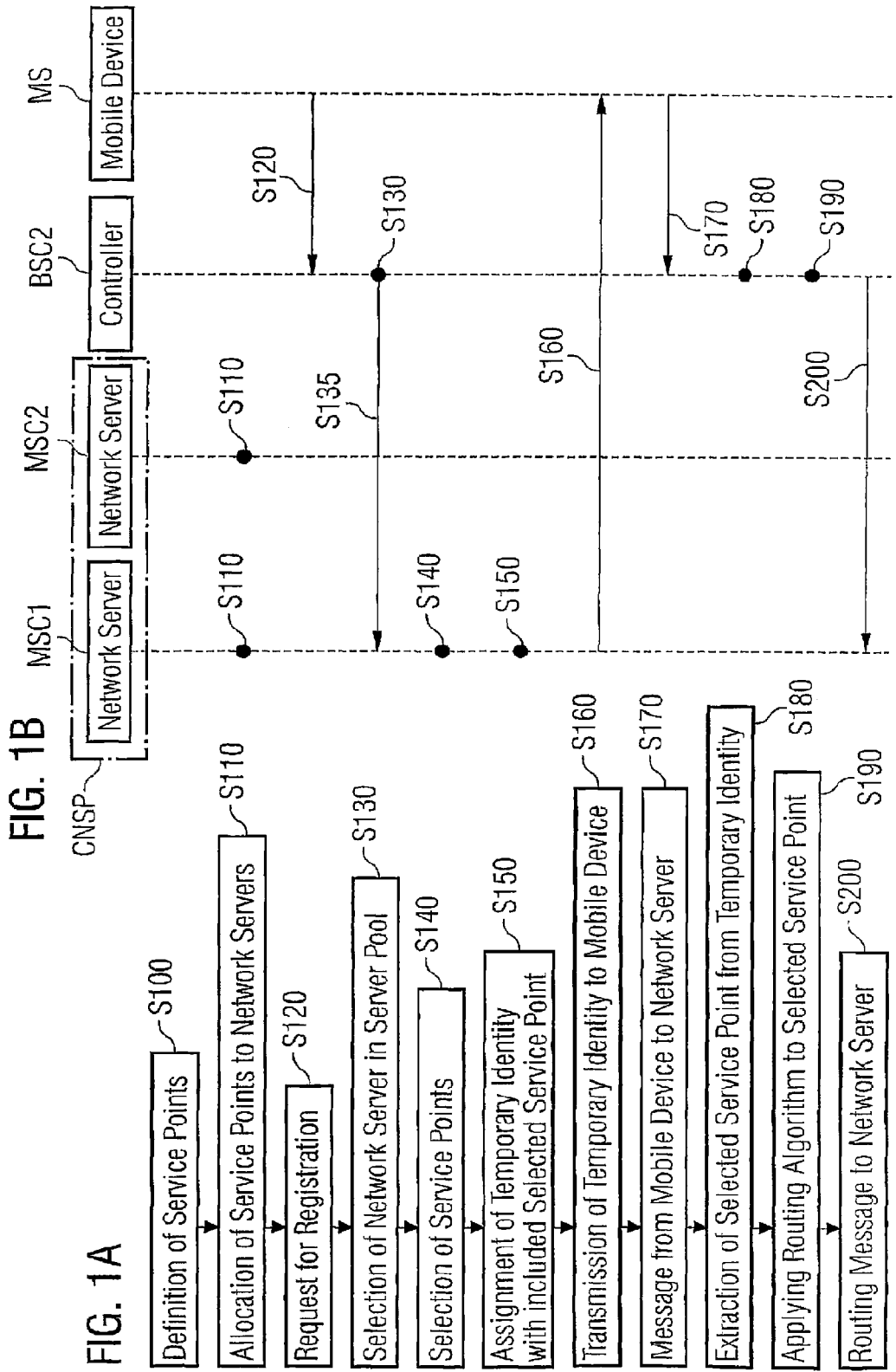

FIG. 3A

| SID | Network Sever | TMSI Numbers per allocated SID ($C_{SID}$) |
|---|---|---|
| 0 | MSC1 | $2^X$ |
| 1 | MSC2 | $2^X$ |
| 2 | MSC3 | $2^X$ |
| 3 | -- | -- |
| 4 | -- | -- |
| 5 | -- | -- |
| . | . | . |
| . | . | . |
| . | . | . |
| $2^n-3$ | -- | -- |
| $2^n-2$ | -- | -- |
| $2^n-1$ | -- | -- |

FIG. 3B

| SP | Network Sever | TMSI Numbers per SP ($C_{SP}$) |
|---|---|---|
| 0 | MSC1 | $2^X$ |
| 1 | MSC2 | $2^X$ |
| 2 | MSC3 | $2^X$ |
| 3 | MSC1 | $2^X$ |
| 4 | MSC2 | $2^X$ |
| 5 | MSC3 | $2^X$ |
| . | . | . |
| . | . | . |
| . | . | . |
| $2^n-3$ | MSC1 | $2^X$ |
| $2^n-2$ | MSC2 | $2^X$ |
| $2^n-1$ | MSC3 | $2^X$ |

FIG. 4A

| SID | Network Sever | TMSI Numbers per allocated SID ($C_{SID}$) | Number of LA/RA per allocated SID ($L_{SID}$) |
|---|---|---|---|
| 0 | MSC1 | $2^X$ | 2 [$LA_{11} + LA_{12}$] |
| 1 | MSC2 | $2^X$ | 2 [$LA_{21} + LA_{22}$] |
| 2 | MSC3 | $2^X$ | 2 [$LA_{31} + LA_{32}$] |
| 3 | -- | -- | -- |
| 4 | -- | -- | -- |
| 5 | -- | -- | -- |
| . | . | . | . |
| . | . | . | . |
| . | . | . | . |
| $2^n - 3$ | -- | -- | -- |
| $2^n - 2$ | -- | -- | -- |
| $2^n - 1$ | -- | -- | -- |

FIG. 4B

| SID | Network Sever | TMSI Numbers per SP ($C_{SP}$) | Number of LA/RA per SP ($L_{SP}$) |
|---|---|---|---|
| 0 | MSC1 | $2^X$ | $2 [LA_{11} + LA_{12}]$ |
| 1 | MSC2 | $2^X$ | $2 [LA_{21} + LA_{22}]$ |
| 2 | MSC3 | $2^X$ | $2 [LA_{31} + LA_{32}]$ |
| 3 | MSC1 | $2^X$ | $2 [LA_{11} + LA_{12}]$ |
| 4 | MSC2 | $2^X$ | $2 [LA_{21} + LA_{22}]$ |
| 5 | MSC3 | $2^X$ | $2 [LA_{31} + LA_{32}]$ |
| . | . | . | . |
| . | . | . | . |
| . | . | . | . |
| $2^n - 3$ | MSC1 | $2^X$ | $2 [LA_{11} + LA_{12}]$ |
| $2^n - 2$ | MSC2 | $2^X$ | $2 [LA_{21} + LA_{22}]$ |
| $2^n - 1$ | MSC3 | $2^X$ | $2 [LA_{31} + LA_{32}]$ |

METHOD AND DEVICES FOR ROUTING A MESSAGE TO A NETWORK SERVER IN A SERVER POOL

CROSS-REFERENCE TO RELATED APPLICATIONS

This application is a continuation of U.S. application Ser. No. 10/469,360, filed May 7, 2004, which was the National Stage of International Application No. PCT/EP02/02147, filed Feb. 28, 2002, the disclosures of which are fully incorporated herein by reference.

FIELD OF THE INVENTION

The present invention relates to the field of mobile communication systems, especially to a method for routing of a message to a network server in a server pool. Devices and computer programs embodying the invention are also described.

BACKGROUND OF THE INVENTION

For identifying a subscriber in a mobile communication system like the Global System for Mobile Communication (GSM) or the Universal Mobile Telecommunication System (UMTS), an International Mobile Subscriber Identity (IMSI) is allocated uniquely and permanently to each subscriber. The IMSI is a number related to all network related subscriber information and is stored in the Subscriber Identity Module (SIM) that is located in a mobile device like a mobile phone of the subscriber. In addition, the IMSI is stored by a network server like the Home Location Register (HLR) and the serving Visitor Location Register (VLR). Unprotected transmission of the IMSI over the air interface between the mobile device and the radio access network should be kept as seldom as possible to prevent misuse, e.g. to prevent an eavesdropper from accessing the IMSI for relating calls non-ambiguously to the subscriber or to establish unauthorized roaming profiles of the subscriber.

Protection is introduced into the mobile communication system using temporary identities whenever possible. These identities are aliases of the IMSI and are changed from time to time with typically local significance. Examples for such temporary identities are the Temporary Mobile Subscriber Identity (TMSI) used for circuit-switched (CS) connections and the Packet TMSI (P-TMSI) for packet switched (PS) connections.

A mobile device registered to the mobile communication system is assigned a temporary identity by a network server like a Mobile service Switching Center (MSC) assigning the TMSI or a Serving General packet radio system Support Node (SGSN) assigning the P-TMSI. Depending on the configuration of the mobile communication system, an assignment of the temporary identity can be triggered by the registration of the mobile device to the network server, by a call attempt, a service activation, or a location update, which is issued when the mobile device changes its location area (LA) for CS connections or routing area (RA) for PS connections. The change of the LA or RA can be indicated to the network server by a change of a LA identity (LAI) or a RA identity (RAI) indicating the LA or RA, respectively. Other procedures triggering the assignment of a temporary identity are an expired or invalid temporary identity received by the network server.

The temporary identity as defined for GSM or UMTS is a number comprising predefined number blocks indicating a domain and a TMSI number. The so defined temporary identity has a bit length of 32 bit and is sometimes also named TMSI-Code (TIC). The number block representing the domain indicates whether the mobile device is registered in the CS or PS domain. According to the present definition, the first two bits are reserved for the number block domain. The temporary identity is sometimes used according to the TIC supplemented by a number block reserved for the LAI or the RAI for TMSI or P-TMSI, respectively. Also other implementations of the temporary identities exist, e.g. in some systems a TMSI generation may be included in the TIC for further assigning of already assigned TMSI numbers.

The 3GPP standard TS 29.002 v.4.2.1 (2000-12), chapter 8.1.4, for mobile communication systems allows to assign the temporary identity on a per network server base, i.e. each assigned temporary identity has to be unique for each network server. 3GPP standard TS24.008 v4.1.1 (2001-01), chapter 4.3.1 and chapter 9.2.15, for mobile communications suggests to assign the temporary identity on a per LA/RA-base, wherein the network server assigning the temporary identity considers also location information like the LAI or RAI and the temporary identity for a mobile device has to be unique within each LA or RA controlled by the network server, i.e. the same temporary identity that is assigned to a mobile device in a first LA of the network server can be assigned in a second LA of the network server for a further mobile device at the same time. Referring to the availability of temporary identities, i.e. the maximum number of possible combinations of temporary identities that can be assigned, the assignment on a per LA/RA base is favorable. For an assignment on a per network server base, the availability is limited by the number of combinations defined by the bit length of the TMSI number. Typically more than one LA or RA per network server exist and the availability of temporary identities for an assignment on a per LA/RA base is therefore much higher just because of the higher number of LA/RAs per network server.

The introduction of a core network server pool, in the following named server pool, provides more flexibility to the mobile communication system. In the server pool, many network servers are grouped such that a mobile device can register to and can be controlled by any of the network servers in the pool. The grouping can be achieved by connecting a controller of the access network with the network servers in the server pool such that the controller is connected to each network server in the server pool. Typically, there are many controllers in the access network that are connected to the network servers as described before.

The server pool is especially advantageous in situations wherein a network server in the server pool fails, is overloaded, or reveals other disturbances. For such situations, the mobile device can be registered to and controlled by a further network server in the server pool thus improving resilience of the mobile communication system with server pool compared to the mobile communication system without server pool, i.e. a mobile communication system wherein each controller is connected to one network server only.

Owing to the fact that for a server pool one controller is connected to multiple network servers, the routing of messages from a mobile device to the network server the mobile device is registered in becomes more difficult. A server identifier is proposed to identify the network server in the server pool for routing a message from a mobile device. During registration of the mobile device to a first server of the server pool, the first server sends its server identifier to the mobile device. Messages from the mobile device to the first network server can be routed to the first network server by analyzing the server identifier in a controller of an access network the mobile device is attached to. According to the document *Introducing flexibility to the Iu interface*, TSG-RAN Working Group Meeting #16, Windsor, UK, 16.-20. Oct. 2000, Agenda Item 12*a*), TSGR3#16(00)2586, the server identifier is proposed to be a part of the TMSI, e.g. the server identifier is included into the temporary identity. The server identifiers are allocated such that each network server has exactly one server identifier. A relation between the server identifiers and the network servers in the server pool can be used to identify the network server from the server identifier comprised in the messages from the mobile device for routing the messages to the network server.

The introduction of the server identifier is essential for the implementation of the server pool into the mobile communication system, because it provides a way to identify the network server for messages from the mobile device to the network server where the mobile device is registered. However, for the preferred implementation that the server identifier is included into the temporary identity, the availability of temporary identities is reduced when the number of network servers in the server pool is less than the number of server identifiers. The number of server identifiers is given by the value according to the bit length of the number block that is reserved within the temporary identity for including the server identifier. For example, a number block of 5 bit reserved for the server identifier relates to a maximum possible number of $2^5=32$ network servers in the server pool. For the case, that the network servers in the server pool do not equal the maximum possible number of network servers, i.e. when less than 32 network servers are in the server pool, the fraction of the number of server identifiers exceeding the number of network servers in the server pool remains unused. Following the present example, a server pool with 6 network servers and 5 bit reserved for the server identifiers leads to a situation where 6 server identifiers are used for identifying uniquely the network serves in the server pool whereas 24 server identifiers are left unused. The same fraction of server identifiers that is left unused determines the reduction of the availability of the temporary identities in the server pool. Following the present example, 6/32 of the temporary identities can be assigned and 24/32 are excluded from being assigned. Only for the special case that 32 network servers are in the server pool, the maximum availability of temporary identities can be achieved.

In summary, the maximum availability can be only achieved when the number of network servers in the server pool equals the number of server identifiers defined by the bit length of the number block reserved for the server identifier. However, this limitation is not acceptable for an operator of a mobile communication system due to capacity and economic reasons.

U.S. Pat. No. 6,091,953 discloses a wireless communication system in which a signaling message from a mobile unit is routed by a message router to a mobile switching center (MSC) serving the mobile unit in a server pool. When a mobile unit attaches to the wireless communication system, the message router assigns the mobile unit to one of the MSCs. The assigned MSC then assigns a temporary identity to the mobile unit that identifies itself as the serving MSC. The temporary identity uniquely identifies the mobile unit. The mobile unit receives the assigned temporary identity from the serving MSC, stores the temporary identity and uses the temporary identity to identify itself in future signaling connections. The temporary identity is included in messages sent from the mobile unit to its serving MSC. The message router, reading the identity of the serving MSC from the temporary identity assigned to the mobile unit routes messages and traffic to the serving MSC. The message router can use a table mapping the MSC identifier to a network address for the routing. In order to embed the information about the serving MSC in the temporary identity represented by a TMSI, all the available TMSI numbers in the network are portioned in n groups with n the number of MSCs in the group and each MSC is assigned one of the n groups. Furthermore, each four-byte TMSI is divided into two portions, wherein the first portion is used as the MSC identifier.

SUMMARY OF THE INVENTION

It is an object of the present invention to provide an improved method, devices and computer programs loadable into devices that provide an optimized availability of temporary identities in a server pool of a mobile communication system.

In the proposed method, a message is routed to a first network server in a server pool of a mobile communication system. The mobile communication system comprises at least one controller of an access network. The controller is connectable to the first network server and at least one further network server in the server pool. In the server pool, service points are defined. The definition of the service points determines a number of service points. Preferably, the number of services points is related to the number of network servers in the server pool and the number of service points exceeds the number of network servers operating in the server pool. The definition of service points may be achieved by determining a number block reserved for the service points. The bit length of the number block accordingly determines the number of service points. The definition of the service points can comprise also the determination of the position of the number block reserved for the service points in a temporary identity. The service points may be preferably defined when the server pool is configured, e.g. by the operator of the mobile communication system via Operation and Maintenance (O&M). The definition may vary from operator to operator or may vary from server pool to server pool.

Furthermore, one or more of the service points that are defined for the server pool are allocated uniquely to each of the network servers in the server pool, i.e. each allocated service point is allocated in a one-to-one relation to one of the network servers. Preferably, all service points that are defined are allocated to the network servers operating in the server pool. Independent from the number of service points and the number of network servers in the server pool, there is in any case at least one network server of the network servers in the server pool that has allocated at least two of the service points. As for the definition of service points, the allocation of the service points may also be achieved via O&M.

Definition and allocation of service points can be seen as steps for a configuration of the server pool and are prerequisites for the routing procedure described in the following three paragraphs. The routing procedure is typically carried out more often than the steps for the configuration.

A temporary identity is assigned by the first network server to a mobile device, e.g. when the mobile device is registered to the first network server or for a location update. The temporary identity includes a selected service point. The selected service point is selected from the one or more service points allocated to the first network server. The one or more service points allocated to the first network server are a subset of the service points that are allocated to the network servers in the server pool. The selected service point is one service point of the subset and identifies uniquely the first network server.

The temporary identity that is assigned by the first network server is transmitted to the mobile device. The mobile device preferably stores the received temporary identity.

A message from the mobile device to the first network server is routed to the first network server. The routing is achieved by first extracting the selected service point from the temporary identity received by the mobile device. Secondly, a routing algorithm is applied to the selected service point. The routing algorithm reveals the first network server from an analysis of the selected service point, e.g. using the selected service point as input into the routing algorithm, the routing algorithm reveals as output an address of the first network server the selected service point is allocated to.

The proposed method for routing of messages to a network server in a server pool optimizes the availability of temporary identities, because all of the service points that are defined by a number block in the temporary identity can be allocated to the network servers in the server pool. If all service points that are defined are allocated, no service points are left unused, i.e. the number block reserved for the service points is fully available for the assignment of temporary identities. In this case, the maximum availability of temporary identities is achieved and all temporary identities can be assigned. Also for the case, that not all service points that are defined are allocated, the proposed method ensures that the availability of temporary identities is optimized. The reason is that the number of allocated service points exceeds the number of network servers operating in the server pool and the number block reserved in the temporary identity for the service points can be used more efficiently compared to prior art thus leaving less temporary identities unused. The number of excess service points, i.e. the difference between the number of the service points that are defined and the number of network servers in the server pool, can be adjusted by the bit length of the number block reserved for the service points. A slightly higher number of service points is easier to handle and to maintain while a significantly higher number provides more flexibility such that particularities like different performances or capacities of individual network servers in the server pool can be addressed more adequately, e.g. the excess service points can be allocated in order to assign further temporary identities to network servers that have more capacity to control mobile devices than other network servers in the server pool. Furthermore, the proposed method overcomes the limitation that the number of network servers directly determines the availability of temporary identities. Instead, any number of network servers less than the number of service points can be chosen in the server pool while a maximum availability of temporary identities can be achieved.

According to a preferred embodiment, the routing algorithm is applied by the controller of the access network. This implementation of the method is advantageous compared to a possible alternative by applying the routing algorithm by the mobile device itself. This alternative may not be preferred just because mobile devices that register to the server pool have to be provided with the routing algorithm and may have to be modified for executing the routing algorithm.

According to another preferred embodiment, the routing algorithm utilizes a table, which relates the allocated service points with the network servers in the server pool. The routing algorithm can search the table for an entry for the selected service point. The detected entry reveals the network server the selected service point is allocated to, i.e. the first network server according to the present notation. From the knowledge of the first network server, the routing algorithm may retrieve an address of the first network server from a separate column of the table or a separate table correlating the network servers in the server pool with the addresses of the network servers. Alternatively, the table utilized by the routing algorithm comprises the allocated service points uniquely related to the addresses of the network servers. For both alternatives, the routing algorithm outputs the address of the first network server from the selected service point. The message from the mobile device to the first network server can be subsequently routed to said address revealed from the routing algorithm.

According to another preferred embodiment, the temporary identity can be included in the message from the mobile device and the controller can extract the selected service point from the temporary identity. This procedure is advantageous, because the mobile device does not have to process the temporary identity received from the first network server. When sending a message, the mobile device can retrieve the temporary identity from its storage and include the temporary identity into the message. The controller receiving the temporary identity can extract the selected service point comprised in the received temporary identity for applying the routing algorithm. The proposed procedure is fully compliant with the processing of temporary identities by mobile devices in present mobile communication systems such that mobile devices does not have to changed for implementing the proposed method.

According to another preferred embodiment, the mobile device can extract the selected service point from the temporary identity and send the selected service point to the controller for applying the routing algorithm. This procedure may require a modification of existing mobile devices, but may be favorable in order to save processing effort at the controller for extracting the selected service point from the temporary identity. This embodiment may be especially helpful in situations when many messages from many mobile devices have to be routed by the controller at the same time.

According to another preferred embodiment, the number of service points is defined by selecting a bit length of a number block reserved for the service points in the temporary identity. The number of service points may have to be changed when the number of network servers approaches the number of service points or when more excess service points are needed to address more adequately inhomogeneities in the server pool. As an example, if one of the network servers in the server pool is replaced by a new network server having significantly more capacity than the other network servers in the server pool, the operator may change the bit length of the number block reserved for the service points in order to create more excess service points. According to the present example, the new network server may have allocated a significantly higher number of service points than the other network servers in the server pool. For a change of the number of service points, the operator may select a new bit length of the number block reserved for the service points in the temporary identity. Especially the steps associated with the selection of the selected service point, the assignment of the temporary identity with included selected service point, the extraction of the selected service point, the routing algorithm, and optionally the table utilizable by the routing algorithm may have to be modified to be capable to process a service point with changed bit length.

According to another preferred embodiment, the service points are re-allocatable to the network servers in the server pool. The number of service points allocated for each network server may be changed providing more flexibility to the server pool, e.g. in order to accommodate for particularities of the network servers in the server pool or after a redefinition of the service points. After reallocation of one or more service points, the routing algorithm may have to be adapted for routing a message comprising one of the one or more reallocated service points.

According to another preferred embodiment, the service points can be allocated depending on a load of at least one of the network servers in the server pool.

As an example, one or more service points that are defined but not already allocated can be allocated depending on the load. Or already allocated service points may be reallocated depending on the load. Or allocated service points may be removed from at least one of the network servers depending on the load. The load of a network server can be a utilization of a network server and may be supervised in an O&M center of the network operator. As a measure for the load, the number of temporary identities that are assigned by a network server to mobile devices can be used. If the number of assigned temporary identities comes close to the availability of temporary identities of the network server, one or more further service points may be allocated via O&M to the network server for increasing the availability of temporary identities of that network server. After the allocation, the network server can assign temporary identities including one of the one or more further service points. Consequently, the routing algorithm has to be updated for routing messages comprising one of the one or more further service points to the network server. The allocation depending on the load can be achieved statically or dynamically. An example for a static allocation is to use predefined settings, e.g. according to expected traffic patterns for certain day times or weekly days like working days and weekend in order to balance subscriber behavior and network performance. Dynamic allocation can be achieved by monitoring the load of one or more network servers and adjusting the number of service points accordingly.

According to another preferred embodiment, the service points can be allocated depending on a load of a link between the controller of the access network and one of the network servers in the server pool. This is especially advantageous if the number of mobile devices controllable by a particular network server is not limited by the capacity of the particular network server itself but by the capacity of the link between the particular network server and the controller. A congestion of the link can be avoided by adapting the number of allocated service points to the capacity of the link. In addition, the link may carry also further traffic. The number of server points allocated to the particular network server may be adapted according to the load of the link associated with the number of mobile devices and the amount of the further traffic, i.e. more server points are allocated for lower further traffic and less are allocated for higher further traffic.

According to another preferred embodiment, the first network server can select the selected service point from the one or more service points allocated to the first network server. The first network server may select the selected service point randomly or depending on the utilization of the one or more service points allocated to the first network server. Alternatively, the controller may select the selected service point introducing even more flexibility into the server pool. The drawback is that due to the much higher number of controllers compared to network servers, the installation effort and maintenance effort is much higher.

According to another preferred embodiment, the temporary identity can be assigned based on location information of the mobile device. This location information can be the LAI or RAI of the mobile device for PS and CS domain, respectively. The network server assigning the temporary identity can analyze the LAI or RAI and can select one of the one or more service points that are allocated to the network server depending on the result of the analysis.

According to another preferred embodiment, the service points are core network server pool service points or location area service points. Core network server pool service points are service points that are defined on a per network server base. A core network server pool service point identifies a service point within each server pool that can be used by any of the network servers of the server pool. The same network server can make use of more than one core network server pool service point, but two different network servers cannot make use at the same time of the same core network server pool service point. Location area service points are service points that are defined on a per LA/RA base. A location area service point identifies a service point within each LA/RA that can be used by any of the network servers in the server pool. The same network server can make use of more than one location area service point, but two different network servers cannot use the same location area service point. For indicating the LA or RA of the mobile device to the network server, the LAI or RAI, respectively can be used. Temporary identities assigned on a per network server base are unique for each network server while temporary identities assigned on a per LA/RA base are unique for each LA or RA.

According to another preferred embodiment, the network servers in the server pool are mobile service switching centers (MSCs) or serving general packet radio service support nodes (SGSNs).

According to another preferred embodiment, the temporary identity is a temporary mobile subscriber identity (TMSI) or a packet temporary mobile subscriber identity (P-TMSI). Preferably, a number block reserved for the service points is defined in the TMSI or P-TMSI while keeping the bit length of the TMSI or P-TMSI constant. Preferably, also the number block domain remains unchanged ensuring that at least mobile devices do not have to be modified with respect to the number block domain.

According to another preferred embodiment, the controller of the access network is a Base Station Controller (BSC) or a Radio Network Controller (RNC).

According to another preferred embodiment, the mobile communication system is a global system for mobile communication (GSM) or a universal mobile telecommunication system (UMTS).

Correlatively, the present invention also concerns devices for executing the proposed method. The devices can be adapted to all embodiments of the method as described above.

A network server exists in a server pool of a mobile communication system. The network server is connectable to a controller of an access network and the network server has allocated at least two service points that uniquely identify the network server in the server pool. The network server comprises a receiver, a transmitter, and a processing unit, wherein the receiver is adapted to receive a request for an assignment of a temporary identity for a mobile device. The request for an assignment of a temporary identity may origin from a location update of the mobile device or a registration of the mobile device to the network server. The processing unit is adapted to assign the temporary identity and to include one selected service point into the temporary identity. The selected service point is selected from the two or more service points allocated to the network server. The transmitter is adapted to send the assigned temporary identity to the mobile device.

A controller of an access network exists in a mobile communication system. The controller is connectable to a first network server and at least one further network server in a server pool. The controller comprises a receiver, a transmitter, and a processing unit, wherein the receiver is adapted to receive a message from a mobile device to the first network server. The message comprises a selected service point, which is uniquely allocated to the first network server. The processing unit is adapted to apply a routing algorithm to the selected service point. The routing algorithm reveals the first network server from an analysis of the selected service point by utilizing a table. The table comprises service points allocated uniquely to the network servers in the server pool. In the table, at least one of the network servers has allocated at least two service points and one of the service points in the table is the selected service point identifying the first network server. The transmitter is adapted to send the message to the first network server.

The present invention also concerns computer programs, each of the computer programs being loadable into a processing unit of a corresponding device. The computer programs comprise portions of software codes in order to implement the method as described above when operated by the corresponding device. The computer programs can be stored on computer readable media. A computer-readable medium can be a permanent or rewritable memory within a device or located externally. The computer programs can be also transferred to the devices for example via a cable or a wireless link as a sequence of signals.

A computer program is loadable into a processing unit of a network server in a server pool of a mobile communication system. The network server is connectable to a controller of an access network. The network server has allocated at least two service points that uniquely identify the network server in the server pool. The computer program comprises code adapted to process a request for an assignment of a temporary identity for a mobile device, to assign the temporary identity and to include one selected service point into the temporary identity. The selected service point is selected from the two or more service points allocated to the network server. The computer program further comprises code to initiate a transmission of the assigned temporary identity to the mobile device.

A computer program is loadable into a processing unit of a controller of an access network of a mobile communication system. The controller is connectable to a first network server and at least one further network server in a server pool. The computer program comprises code adapted to apply a routing algorithm to a selected service point included in a message from a mobile device to the first network server. The selected service point is uniquely allocated to the first network server and the routing algorithm reveals the first network server from an analysis of the selected service point by utilizing a table comprising service points allocated uniquely to the network servers in the server pool. In the table, at least one of the network servers has allocated at least two service points and one of the service points in the table is the selected service point identifying the first network server. The computer program comprises code adapted to initiate a sending of the message to the first network server.

In the following, detailed embodiments of the present invention shall be described in order to give the skilled person a full and complete understanding. However, these embodiments are illustrative and not intended to be limiting, as the scope of the invention is defined only by the appended claims.

BRIEF DESCRIPTION OF THE FIGURES

FIG. 1a shows a flow-chart diagram of a first embodiment of the proposed method;

FIG. 1b shows processes and messages by devices adapted to perform the first embodiment of the proposed method;

FIG. 3a shows a table for illustrating the availability of temporary identities in a server pool according to prior art wherein the temporary identities are assigned on a per network server base;

FIG. 3b shows a table for illustrating the availability of temporary identities in a server pool according to the present invention wherein the temporary identities are assigned on a per network server base;

FIG. 4a shows a table for illustrating the availability of temporary identities in a server pool according to prior art wherein the temporary identities are assigned on a per LA/RA base;

FIG. 4b shows a table for illustrating the availability of temporary identities in a server pool according to the present invention wherein the temporary identities are assigned on a per LA/RA base;

DETAILED DESCRIPTION OF THE INVENTION

Figure 2A:
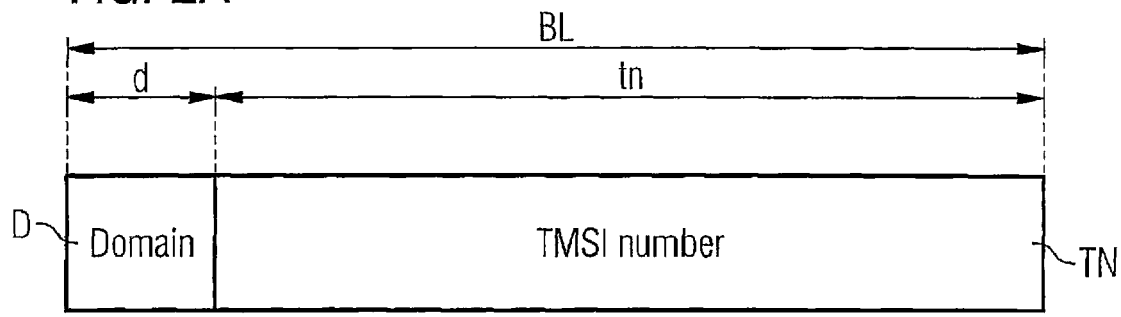
FIG. 2a shows a structure of a temporary identity according to prior art.

FIG. 1a shows a flow chart diagram of a first embodiment of the proposed method and FIG. 1b shows an example of messages and processes executed by devices for carrying out the proposed method according to the flow-chart diagram in FIG. 1a. Depending on the implementation or case, it may be advantageous to integrate additional processes or messages like a confirmation of a process or message before the next process or message, respectively, is executed in order to ensure that the previous process or message, respectively, has been carried out correctly or just to acknowledge the correct transmission of a message.

The proposed method starts with a configuration of the server pool CNSP wherein service points are defined S100 and allocated S110. According to the present example, the server pool CNSP comprises a first network server MSC1 and a further network server MSC2. Both network servers MSC1; MSC2 in this example are of the same type with the type being either MSC or SGSN. First of all, the service points in the server pool CNSP are defined S100: A number of service points may be defined by a number block reserved for the service points in a temporary identity. Also, the position of the number block within the temporary identity can be defined. The service points are preferably defined S100 by the operator of the mobile communication system who may consider the actual or future number of network servers in the pool for the definition of the number of service points. A requirement of the proposed method is that the service points are defined S100 such that the number of service points exceeds the number of network servers MSC1; MSC2 operating in the server pool CNSP. In addition, the operator may also take into account the actual or future capacity or utilization of each of the network servers MSC1; MSC2. Based on these considerations, the service points can be defined S100 such that the number of service points exceeds the number of network servers MSC1; MSC2 slightly or significantly, e.g. in order to achieve an easier processing or more flexible allocation of the service points in the following processes, respectively. Alternatively, the number block in the temporary identity may be standardized such that the total bit length and the position is fixed. In this case, the service points cannot be defined S100 by the operator.

The service points that are defined S100 can be allocated S110 to the network servers MSC1; MSC2 in the server pool CNSP. Preferably, all service points that are defined S100 are allocated S110 to achieve the maximum availability of temporary identities. However, the server pool CNSP may also be configured such that not all defined S100 service points are allocated S110 for the expense of a reduced availability of the temporary identities. Not allocated service points may be allocated S110 in a situation when a device like a network server or link fails and a spare device has to be activated for replacing or bypassing the failed device. The allocation of not allocated service points to the spare device may be executed faster or easier than reallocating service points that are allocated S110 to further network servers to the spare network server. In any case, at least one of the network servers has allocated at least two service points. Depending on the number of excess service points, many service points may be allocated to many network servers. As an example, a server pool having 3 network servers has 64 service points according to a number block reserved for the server points with a bit length of 6. A possible distribution of the 64 service points to the three network servers may be 15 service points allocated to the first network server, 15 service points allocated for the second network server and 34 service points for the third network server. In general, the service points can be allocated S110 homogeneously or non-homogeneously, statically or dynamically to the network servers MSC1; MSC2 in the server pool CNSP. However, maximum flexibility and performance is achieved for a dynamic allocation taking into account individual performances and loads of network servers MSC1; MSC2 and links of the server pool CNSP. When the service points are allocated S110, a selection function may be provided to the network servers MSC1; MSC2. The selection function can be used by the individual network server to select a service point from the service points that are allocated S110 to the individual network server. The selection function may consider supplementary information like the number of already assigned temporary identities for each service point that is allocated S110 to the network server. The selection function may be updated via O&M by the network operator after a reallocation and may be transmitted to the network servers MSC1; MSC2 in the server pool CNSP. In addition, a routing algorithm is provided to the controllers like BSCs or RNCs of the access network AN. When applied S190 to one of the allocated service points, the routing algorithm outputs the network server said service point is allocated S110 uniquely to. Preferably, the routing algorithm utilizes a table that reveals the relation between the service points that are allocated S110 and the network servers MSC1; MSC2 in the server pool CNSP, e.g. by correlating the allocated service points with the addresses of the network servers MSC1; MSC2 in the server pool CNSP. After a reallocation of service points, the table is preferably updated accordingly.

A mobile device MS that registers S120 to the mobile communication system within the coverage of the access network AN of the server pool CNSP, attaches first to a controller BSC2 of the access network AN. The controller BSC2 can be a BSC or RNC for a GSM or UMTS system, respectively, and may execute a selection S130 of one of the network servers MSC1; MSC2 in the server pool CNSP. The controller BSC2 may use a list that comprises the network servers MSC1; MSC2 in the server pool CNSP. For the selection S130 of one of the network servers MSC1; MSC2, the controller BSC2 may take into account location information of the mobile device MS, of the controller BSC2 or of one or more of the network servers MSC1; MSC2 or may consider capacity or utilization information, e.g. indicating the capacity or load of a link or at least one of the network servers MSC1; MSC2. According to FIG. 1, the controller BSC2 executes the selection S130 of the first network server MSC1. The selection S130 may include a transmission of a message S135 to the selected network server informing the first network server MSC1 about the selection S130. The step where the mobile device MS registers S120 may be replaced by a message that indicates a change of the location area of the mobile device MS to the first network server MSC1 (location update not shown in FIG. 1). The selection S130 of one of the network servers MSC1; MSC2 in the server pool CNSP can be skipped in the case of a location update. All following messages and processes for a location update can be processed accordingly to the following description of FIG. 1.

One of the one or more service points allocated to the first network server MSC1 is selected S140, e.g. by the first network server MSC1. The selected service point may be selected S140 based on the availability of temporary identities. A temporary identity for the mobile device is assigned S150 by the first network server MSC1 and the selected service point is included into the temporary identity. The temporary identity is transmitted S160 from the first network server MSC1 to the mobile device MS, where the received temporary identity can be stored.

The temporary identity can be used for routing a message S170 from the mobile device MS to the first network server MSC1. The mobile device MS can retrieve the stored temporary identity and include the temporary identity into a message S170 to be sent first to the controller BSC2 where the mobile device MS is attached to. The temporary identity may be detected by the controller BSC2 and the selected service point can be extracted S180 by the controller BSC2 from the temporary identity. Alternatively, the mobile device MS may extract the selected service point from the temporary identity and send the selected service point to the controller BSC2 for further routing of the message S170. In the alternative case, the controller does not have to extract the selected service point from the temporary identity (alternative case not shown in FIG. 1). For identifying the first network server MSC1 associated with the selected service point, the routing algorithm can be applied S190 by the controller BSC2 to the selected service point, e.g. it can be searched in a table revealing the correlation of the service points allocated to the network servers in the server pool for an entry for the selected service point. The entry can reveal an address of the first network server MSC1. From the knowledge of the address of the first network server MSC1, the message S170 or one or more further messages can be routed S200 to the first network server MSC1.

For one or more further messages from the mobile device MS to the first network server MSC1, the mobile device MS may include the temporary identity or the selected service point into all of the further messages. The one or more further messages can hence be routed S200 to the first network server MSC1 according to the proposed method as described before. Alternatively, the first network server MSC1 or the controller BSC2 may assign a temporary identifier that may be used for routing the further messages from the mobile device MS within the duration of a connection, e.g. for a voice call or data session. By assigning a temporary identifier, a logical channel can be opened that concatenates following messages as it is commonly applied for example in a dialog. Typically a temporary identifier is a number block of less digits than the temporary identity thus saving transmission cost and processing effort. When the connection is released, the temporary identifier is invalidated and the mobile device MS can use the temporary identity for subsequent messages to the first network server MSC1.

FIG. 2a shows the structure of the temporary identity when the server pool CNSP is not supported. The temporary identity is a number block of a certain bit length BL. Currently, the TMSI and P-TMSI are specified to have a bit length BL of 32 bit. The structure contains the number block D having a bit length d of 2 bit reserved for the domain and the number block TN for the TMSI number having a bit length tn of 30 bit.

Figure 2B:
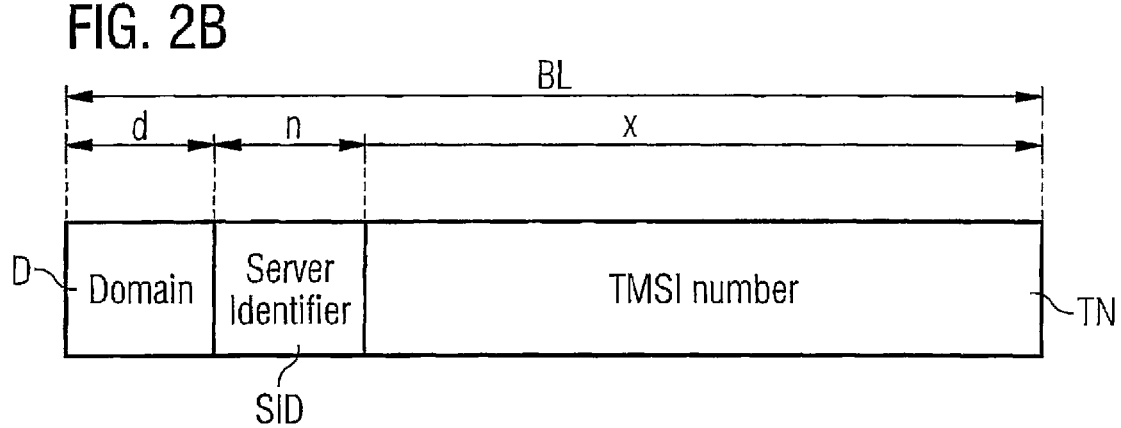
FIG. 2b shows a structure of a temporary identity with number block for server identifiers for use in a server pool according to prior art.

FIG. 2b shows a structure of the temporary identity for use in a server pool CNSP according to prior art. This temporary identity can be composed of a number block D reserved for the domain, a number block SID reserved for the server identifier, and a number block TN reserved for the TMSI number.

Figure 2C:
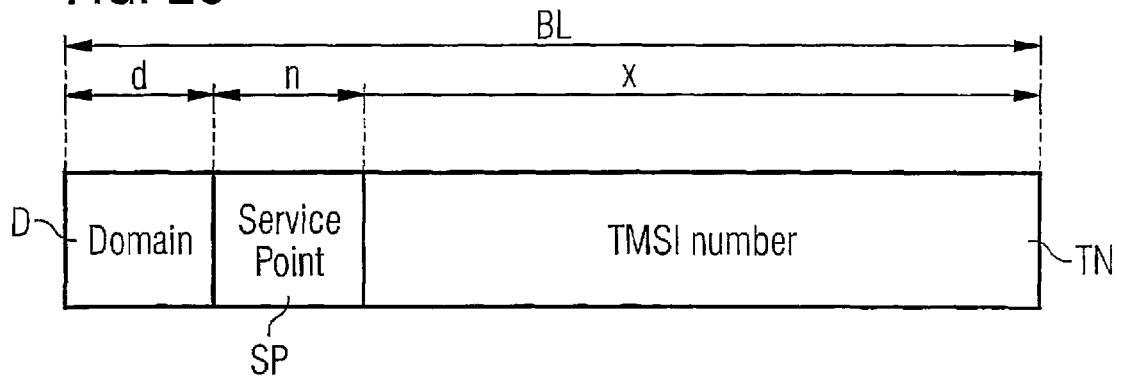
FIG. 2c shows a structure of a temporary identity with number block for service points for use in a server pool according to the present invention.

FIG. 2c shows a preferred structure of the temporary identity for use in a server pool CNSP according to the present invention. The temporary identity can be composed of a number block D reserved for the domain, a number block SP reserved for the service point, and a number block TN reserved for the TMSI number. The bit length n of the number block SP reserved for service points or the bit length x of the number block TN reserved for TMSI numbers may be standardized or may be set by the operator of the respective server tool. The corresponding applies for the relative position of the number blocks D; SP; TN within the temporary identity. For compatibility reasons, the bit length BL of the temporary identity for the server pool CNSP according to the present invention preferably equals the bit length BL of the temporary identity as shown in FIG. 2a. The corresponding applies for the bit length d and position of the number block D for the domain. Note that only for the following comparisons on the availability of temporary identities for the server pool CNSP according to prior art and for the present invention, the bit length n of the number block SID reserved for the server identifier and the bit length n of the number block SP reserved for the service point have been chosen identically. The corresponding applies to the bit length x for the number block TN reserved for the TMSI number in FIG. 2b and FIG. 2c. Furthermore, the proposed method can be applied to temporary identities comprising a number block for TMSI generation. However, a number block for TMSI generation is not considered in the following descriptions.

In FIGS. 3a and 3b, the availabilities of temporary identities for a server pool CNSP according to prior art and according to the present invention, respectively, are evaluated for an assignment on a per network server base. For comparison, the temporary identities are structured according to FIGS. 2b and 2c, respectively, as explained above. Only the number block SID, the number block SP, and the number block TN have been considered in the following evaluation. The number block D has been not considered as this block is reserved for the indication of the domain.

The table in FIG. 3a shows in its first column the server identifiers (SID) which are available for a number block SID of a bit length n of n bits. The number of service points which can be defined S100 by such a number block SID reserved for server identifiers according to FIG. 2b is $2^n$. In the present example, the server pool CNSP has three network servers, which are denoted by MSC1, MSC2, and MSC3 in the second column of the table. Only three of the server identifiers can be allocated to the network servers in the server pool CNSP. The number of not allocated server identifiers amounts to the difference between the number of server identifiers ($2^n$) according to the bit length n of the number block SID reserved for server identifiers and the number of network servers ($N_{NS}$) in the server pool, i.e. $2^n - N_{NS}$ for the number of not allocated server identifiers. In the third column, the maximum number of TMSI numbers ($C_{SID}$) that can be assigned for each server identifier that is allocated in the server pool CNSP is shown. According to the bit length x of x=BL−n−d bit, the maximum number of TMSI numbers amounts to $2^x$ for each allocated server identifier. Due to the fact, that $2^n - N_{NS}$ service identifiers are not allocated, the corresponding TMSI numbers are excluded from being used for the assignment of temporary identities. These excluded TMSI numbers are indicated by "--" in the table. The following formula (1a-b) calculates the availability ($N_A$) of temporary identities of a server pool CNSP according to prior art for an assignment on a per network server base without considering the number block D.

$$N_A = \sum_{SID=0}^{SID=N_{NS}-1} C_{SID} \tag{1a}$$

$$= N_{NS} * 2^X \tag{1b}$$

Basically, the formula (1a) calculates the sum over the maximum number of TMSI numbers ($C_{SP}$) for server identifiers allocated to network servers in the server pool CNSP. For the present example of three network servers, the result of 1b) is $3*2^x$. Obviously, the $2^n - N_{NS}$ server identifiers, which are not allocated, do not contribute to the sum. Only for the case that the number of network servers equals the number of allocated server identifier, the maximum availability of temporary identities in a server pool CNSP can be achieved, i.e. for $N_{NS} = 2^n$. However, the number of network servers in a server pool CNSP is preferably chosen according to the number of subscribers expected to be covered by the server pool CNSP. In most cases, the number of network servers is less than $2^n$ at the expense of a reduction of the availability of temporary identities. Alternatively, matching the number of network servers with the number of service points for achieving a maximum availability of temporary identities is often not recommended due to economic reasons. In summary, the determination of the availability of temporary identities by the number of network servers is not acceptable in many situations.

FIG. 3b shows a table for a corresponding situation as in FIG. 3a modified for a server pool CNSP according to the present invention. Obviously, the server identifiers (SID) are replaced by the service points (SP) in FIG. 3b. In the first column, the $2^n$ service points that are defined S100 by the number block SP of bit length n are shown. All $2^n$ service points are allocated S110 to the three network servers MSC1, MSC2, and MSC3 in the server pool CNSP. The network servers can have allocated multiple service points such that no service point is left unused as shown in column two. The third column shows the maximum number of TMSI numbers that can be assigned for each allocated service point ($C_{SP}$). According to the present example of a bit length x of the number block reserved for the TMSI number, the available TMSI numbers per service point ($C_{SP}$) amounts to be $2^x$ for each service point as in the previous example in FIG. 3a. In contrast to the table in FIG. 3a, the third column is completed in FIG. 3b, because all service points are allocated S110. The following formula (2a-b) gives the availability ($N_A$) of temporary identities that can be assigned for a server pool CNSP on a per network server base according to the present invention without considering the number block D.

$$N_A = \sum_{SP=0}^{SP=2^n-1} C_{SP} \quad (2a)$$

$$= 2^n * 2^X \quad (2b)$$

For a temporary identity as defined in FIG. 2c, the formula calculates essentially the sum over all TMSI numbers per service point ($C_{SP}$) in column three for all service points given in column one. Due to the fact that all service points are allocatable to any number of network servers in the server pool CNSP, the maximum availability of temporary identities is achievable independent from the number of network servers in the server pool CNSP. In contrast to prior art, the number of network servers in the server pool CNSP can be freely chosen, e.g. the number of network servers can be matched to the number of subscribers expected for the server pool CNSP. In addition, the maximum availability of temporary identities can always be achieved if all service points that are defined S100 by a number block in the temporary identity are allocated S110 to the network servers in the server pool CNSP. According to the present invention, the number of network servers does not limit the availability of the temporary identities.

The table in FIG. 4a reflects a corresponding situation as the table given in FIG. 3a with the difference that temporary identities are now assigned on a per LA/RA base instead of a per network server base. In the present example there are three network servers MSC1, MSC2, and MSC3 and two location areas per network server, i.e. LA1 and LA2. The location areas are indicated by $LA_{ij}$ with i=1, 2, 3 being the number for the network server and j=1, 2 being the number for the LA (different indexing can mean the same location area). The number of LAs and the $LA_{ij}$ given for each of the server identifiers that are allocated to the network servers are given in column four of the table. The availability ($N_A$) of temporary identities for a server pool CNSP according to prior art for an assignment on a per LA/RA base can be calculated according to following formula (3a-b) without considering the number block D.

$$N_A = \sum_{SID=0}^{SID=N_{NS}-1} C_{SID} * L_{SID} \quad (3a)$$

$$N_{A'} = N_{NS} * 2^X * 2 \quad (3b)$$

(3a) calculates the availability ($N_A$) for an arbitrary number of network servers and an arbitrary number of location areas per allocated server identifier, (3b) calculates the availability ($N_{A'}$) for 2 location areas per allocated server identifier. For the present example of three network servers and two location areas, the availability amounts to $3*2^x*2$. The availability of temporary identities is increased for an assignment on a per LA/RA base compared to the assignment on a per network server base just because of the typically higher number of location areas. This can be easily seen from comparing FIG. 4a with FIG. 3a and formula (3a-b) with (1a-b). However, also for the assignment on a per LA/RA base temporary identities are left unused in the case that the number of network servers ($N_{NS}$) does not equal the number of server identifiers of $2^n$.

FIG. 4b shows a table for a corresponding situation as in FIG. 4a modified for a server pool CNSP according to the present invention. Obviously, the server identifiers (SID) are replaced by the service points (SP) in FIG. 3b. All $2^n$ defined service points of column one are allocated S110 to the three network servers MSC1, MSC2, and MSC3 in column two. In column three and four the number of TMSI numbers that can be assigned for each allocated service point and the corresponding number of LAs with the $LA_{ij}$, respectively, are given according to the present example. The following formula (4a-b) can be used to calculate the availability of temporary identities accordingly without considering the number block D.

$$N_A = \sum_{SP=0}^{SP=2^n-1} C_{SP} * L_{SP} \quad (4a)$$

$$N_{A'} = 2^n * 2^X * 2 \quad (4b)$$

Again, the availability of temporary identities is not limited by the number of network servers in the server pool CNSP and the maximum availability is achieved when all service points are allocated S110. As it can be easily seen from a comparison of formula (4a-b) with formula (2a-b), the assignment on a per LA/RA base increases the availability compared to the assignment on a per network server base due to the typically higher number of LA/RAs.

Figure 5:
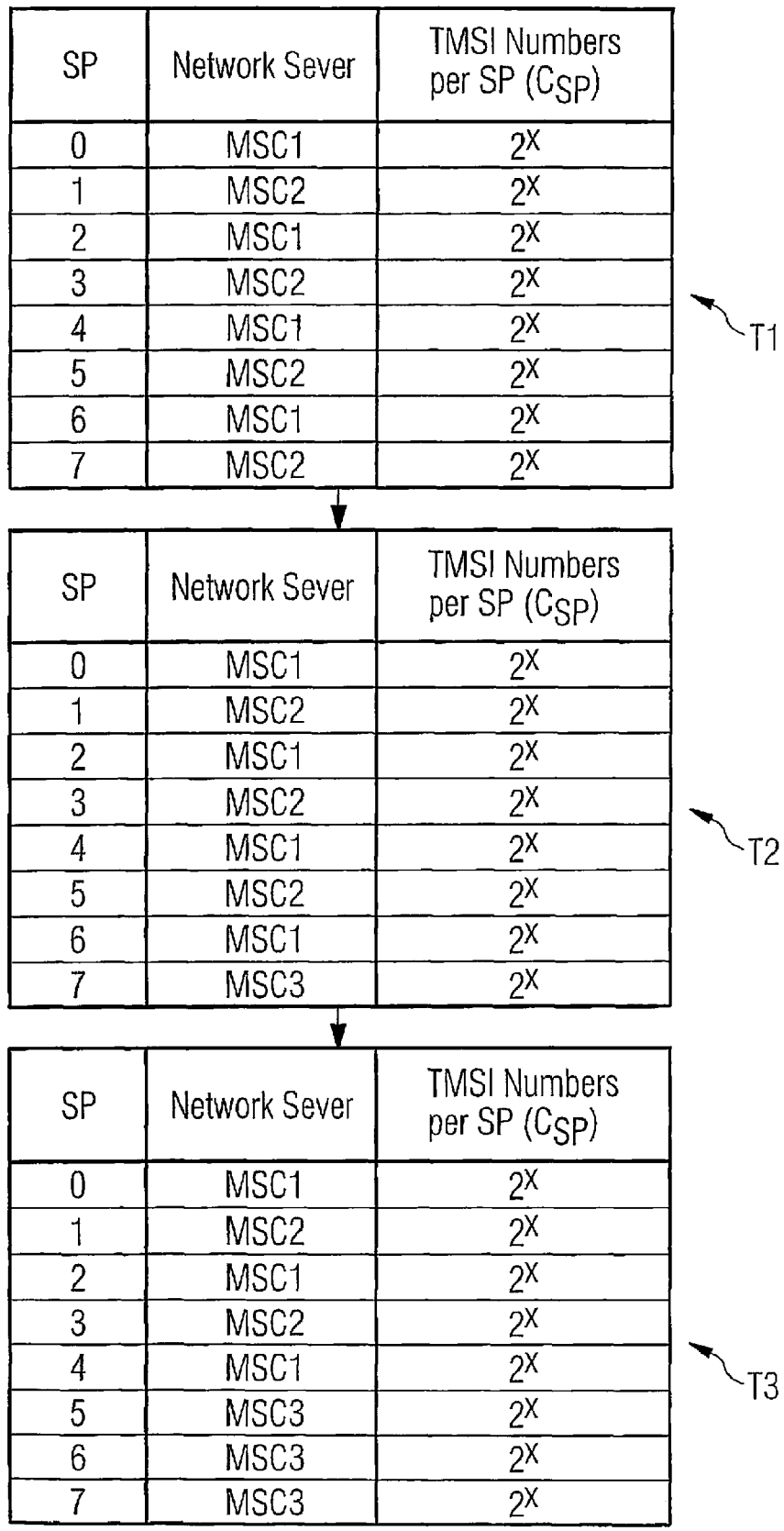
FIG. 5 shows a flow of tables indicating an allocation of service points to network servers in the server pool for different states of the server pool.

FIG. 5 shows a flow of tables for illustrating modifications in a server pool CNSP that can be executed according to the present invention. In the first column, the service points according to a number block of 3 bit are given translating into a total number of $2^3$=8 service points. The first table represents a first state T1 of the server pool CNSP comprising two network servers MSC1 and MSC2. All 8 service points are allocated S110 to the two network servers MSC1 and MSC2 giving a maximum availability of temporary identities as also indicated by the number of TMSI numbers in completed column three. The second table reflects a second state T2 different from the first state T1. A new network server MSC3 is introduced into the server pool CNSP by removing the service point 7 from MSC2 and allocating the removed service point 7 to MSC3. The third table reflects a third state T3 of the server pool CNSP different from the first and second states T1; T2. Service points 5 and 6 are removed from MSC2 and MSC1, respectively, and are allocated S110 to MSC3. In all depicted states T1; T2; T3, the maximum availability of temporary identities is achieved independent from the number of network servers in the server pool CNSP. Depending on the implementation or case, the allocation of the service points may be preferably executed service point by service point in order to avoid congestion of links in the core network as explained in detail later on.

It is also possible to decrease the number of service points allocated S110 to a network server, e.g. in order to reduce its load. In the third state T3, MSC3 has allocated S110 the service points 5, 6, and 7. In a situation, when MSC3 reveals errors or needs to be upgraded, the load of MSC3 can be reduced by reducing the availability of temporary identities for MSC3. The reduction of the availability can be achieved by a reduction of the service points allocated to MSC3. When changing from state T3 to state T2 according to the present example, service points 5 and 6 are removed from MSC3 thus reducing the load of MSC3 by 67%. The maximum availability of temporary identities is maintained in the server pool CNSP, when the removed service points 5 and 6 are allocated S110 to the further network servers in the server pool, i.e. to MSC2 and MSC1 according to the present example. Disconnecting a network server from the server pool CNSP can be achieved by removing all service points from a network server, e.g. for disconnecting MSC3 this may be achieved by starting from the third state T3 to the first state T1 or from the second state T2 to the first state T1.

FIG. 5 reveals modifications of a server pool CNSP for an assignment of temporary identities on a per network server base. However, it is obvious from the previous explanations given especially with respect to FIGS. 3 and 4 to expand the tables and the corresponding explanations of FIG. 5 for an assignment on a per LA/RA base.

Preferably, service points are gradually allocated S110 to a network server, e.g. service point by service point in order to avoid peaks in the signalling load within the core network. For example if a new network server is added to a server pool CNSP and one or more service points are allocated, the new network server lacks of subscriber data. When mobile devices register to the newly introduced network server, the network server requests subscriber data related to the mobile device MS from the HLR. By allocating only one or a few service points when adding the network server to the server pool CNSP, the fraction of mobile devices within the server pool CNSP that are served by the newly introduced network server increases slowly thus avoiding congestion of the core network signalling between the newly introduced network server and the HLR. Generally, such congestion can be avoided by allocating a limited number of service points per time period.

Figure 6:
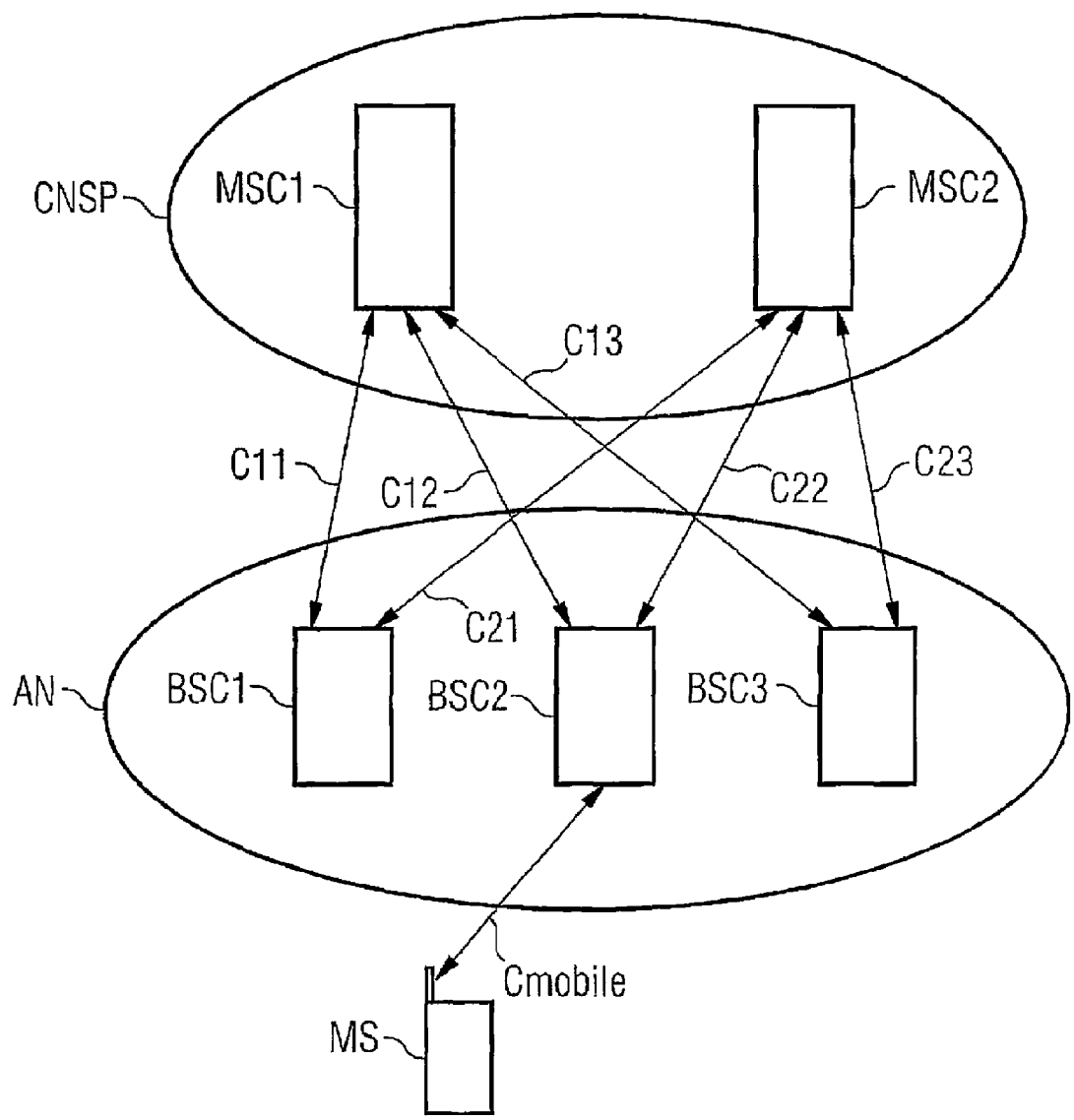
FIG. 6 shows a first example for a mobile communication system comprising network servers of a server pool, controllers of an access network, a mobile device, and connections for exchanging messages between the individual devices.

FIG. 6 shows an example for a communication system according to the present invention. A server pool CNSP comprising two network servers MSC1; MSC2, an access network AN comprising three controllers BSC1; BSC2; BSC3 and a mobile device MS are depicted. A characteristic feature of the server pool CNSP are the links C11; C12; C13; C21; C22; C23 between the network servers MSC1; MSC2 and the controllers BSC1; BSC2; BSC3. Per definition of the server pool CNSP, each of the controllers BSC1, BSC2, BSC3 is connectable to each of the network servers MSC1; MSC2 in the server pool CNSP thus enabling each mobile device to be served by any of the network servers MSC1; MSC2 in the server pool CNSP. According to FIG. 6, the mobile device MS is attached via the wireless link Cmobile to the controller BSC2 of the access network AN. When the mobile device MS registers S120 to the server pool CNSP, the controller BSC2 performs a selection S130 of one of the network servers MSC1; MSC2 in the server pool CNSP to control the mobile device MS. The selected network server, i.e. for example the first network server MSC1, proceeds such that one service point from the one or more service points allocated S110 to the first network server MSC1 is selected S140, a temporary identity for the mobile device MS is assigned S150, and the selected service point is included into the assigned temporary identity which is subsequently transmitted S160 via link C12 and link Cmobile to the mobile device MS. For example during a call setup the mobile device MS sends a message S170 for the first network server MSC1 to the controller BSC2 via link Cmobile. The message S170 comprises the temporary identity assigned to the mobile device MS by the first network server MSC1. The controller BSC2 detects the temporary identity and the selected service point comprised in the temporary identity is extracted S180 by the controller BSC2. Alternatively, the mobile device can extract the selected service point from the temporary identity and can send selected service point to the controller BSC2 via link Cmobile. For identifying the first network server MSC1 associated with the selected service point, a routing algorithm is applied S190 by the controller BSC2 to the selected service point. The selected service point is analyzed, e.g. it is searched in a table accessible by the controller BSC2 for an entry for the selected service point. The detected entry reveals an address of the first network server MSC1. From the knowledge of the address of the first network server MSC1, the message S170 and optionally one or more further messages can be routed S200 by the controller BSC2 to the first network server MSC1 via link C12. If the first network server MSC1 is not accessible e.g. due to a disturbance of the first network server MSC1 or of the link C12 between the controller BSC2 and the first network server MSC1, the controller BSC2 may select one further network server MSC2 in the server pool CNSP for controlling the mobile device MS, e.g. via link Cmobile and link C22.

Figure 7A:
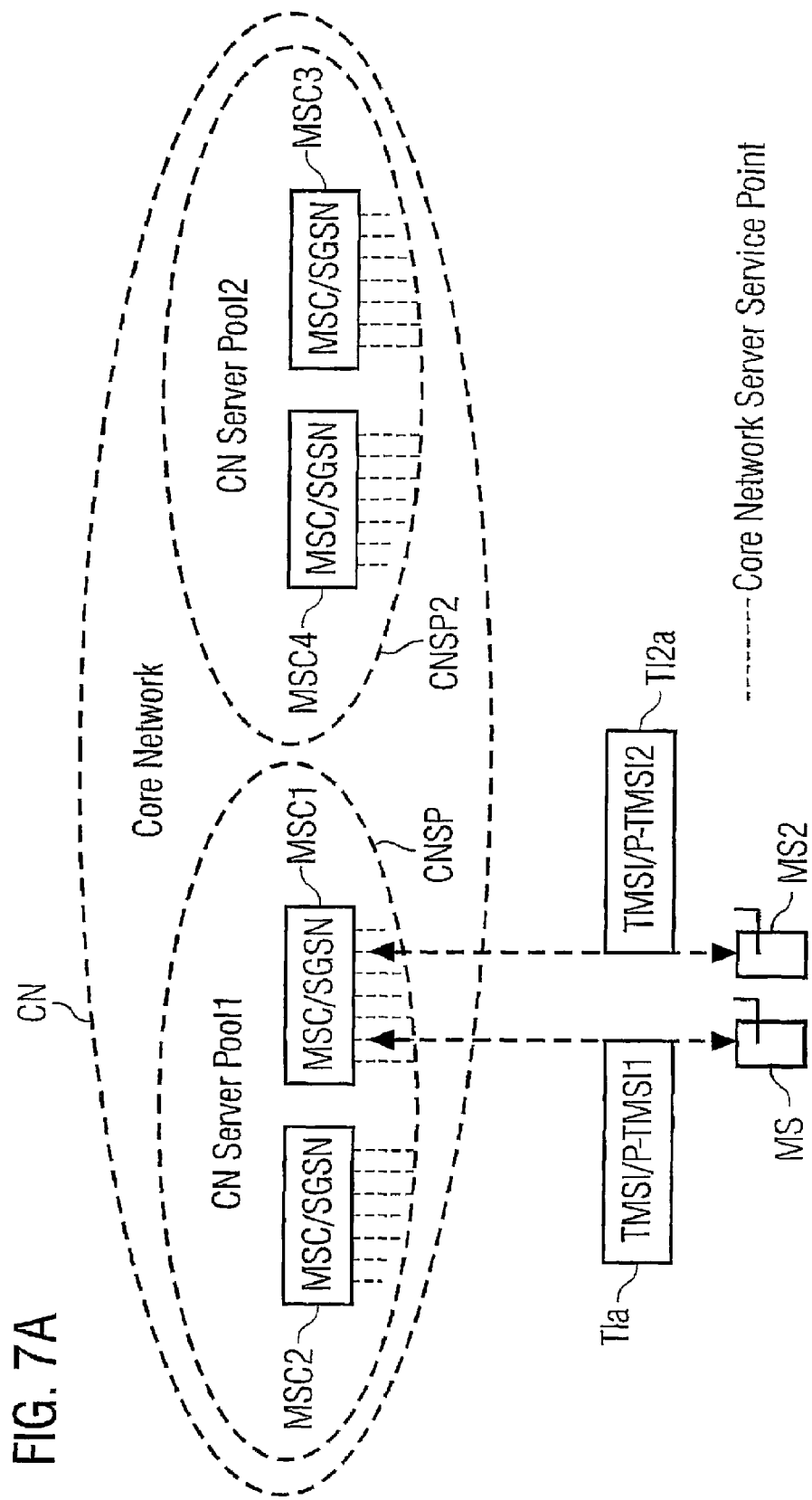
FIG. 7a shows a second example of a mobile communication system adapted to assign temporary identities on a per network server base according to the present invention.
Figure 7B:
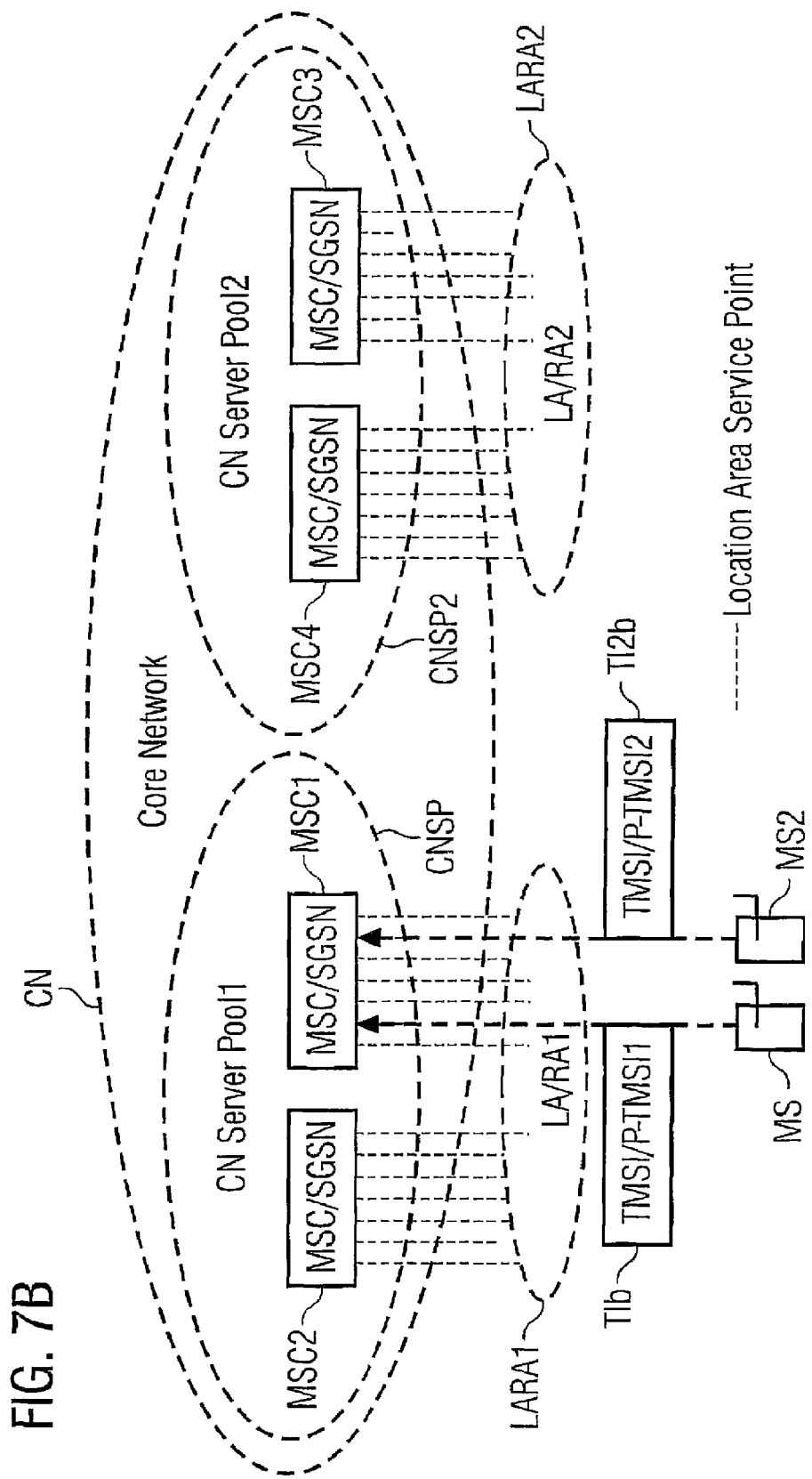
FIG. 7b shows a third example of a mobile communication system adapted to assign temporary identities on a per LA/RA base according to the present invention.

FIGS. 7a and 7b show two further examples for a mobile communication system adapted to execute the method according to the present invention on a per network server base and a per LA/RA base, respectively. The mobile communication system comprises a core network CN comprising a first server pool CNSP and a second server pool CNSP2. The first server pool CNSP comprises two network servers MSC1; MSC2, e.g. MSCs, and the second server pool CNSP2 comprises two network servers MSC3; MSC4, e.g. SGSNs. In addition, FIG. 7b depicts also a first location/routing area LARA1 of the first server pool CNSP and a second location/routing area LARA2 of the second server pool CNSP2. Core network server pool service points for an assignment of temporary identities on a per network server base and location area service points for an assignment of temporary identities on a per LA/RA base are depicted in FIGS. 7a and 7b, respectively. Two mobile devices MS; MS2 controlled by the first network server MSC1 in the first server pool CNSP are shown in both figures.

In FIG. 7a, both mobile devices MS; MS2 are controlled by the same network server MSC1, but the mobile devices MS; MS2 are assigned to different core network server pool service points. This means that both mobile devices MS; MS2 can have the same domain and the same TMSI number values in the temporary identity, even though the temporary identity TIa of the first mobile device MS is different from the temporary identity TI2a of the second mobile device MS2 due to the different core network server pool service points.

In FIG. 7b, both mobile devices MS; MS2 are controlled by the same network server MSC1, but the mobile devices MS; MS2 are assigned to different location area service points. This means that both mobile devices MS; MS2 can have the same domain and the same TMSI number values in the temporary identity, even though the temporary identity TIb of the first mobile device MS is different from the temporary identity TIb of the second mobile device MS2 due to the different location area service points.

The above embodiments admirably achieve the objects of the invention. However, it will be appreciated that departures can be made by those skilled in the art without departing from the scope of the invention which is limited only by the claims.

What is claimed:

1. Method for operating a network server (MSC1) in a server pool (CNSP) of a mobile communication system, the server pool having at least one further network server (MSC2), the network server (MSC1) being connectable to a controller (BSC2) of an access network (AN), the network server (MSC1) having allocated at least two service points that uniquely identify the network server (MSC1) in the server pool (CNSP), the method comprising the steps of:
receiving a request for an assignment of a temporary identity for a mobile device (MS);
assigning the temporary identity and including one selected service point being selected from the two or more service points allocated to the network server (MSC1) into the temporary identity; and
sending the assigned temporary identity to the mobile device (MS).

2. The method according to claim 1, further comprising the step of re-allocating the service points to the network servers (MSC1, MSC2) in the server pool (CNSP).

3. The method according to claim 2, wherein the service points are allocated depending on a load of at least one of the network servers (MSC1, MSC2) in the server pool (CNSP).

4. The method according to claim 2, wherein the service points are allocated depending on a load of a link between the controller (BSC2) of the access network (AN) and one of the network servers (MSC1, MSC2) in the server pool (CNSP).

5. The method according to claim 1, wherein the network server (MSC1) selects the selected service point.

6. The method according to claim 1, wherein the temporary identity is assigned based on location information of the mobile device (MS).

7. The method according to claim 1, wherein the controller (BSC2) of the access network (AN) is a base station controller or a radio network controller.

8. The method according to claim 1, wherein the mobile communication system is a global system for mobile communication or a universal mobile telecommunication system.

9. A method for operating a controller (BSC2) of an access network (AN) of a mobile communication system, the controller (BSC2) being connectable to a first network server (MSC1) and at least one further network server (MSC2) in a server pool (CNSP), the method comprising the steps of:
receiving a message from a mobile device (MS) to the first network server (MSC1), the message comprising a selected service point which is uniquely allocated to the first network server (MSC1);
applying a routing algorithm to the selected service point, the routing algorithm revealing the first network server (MSC1) from an analysis of the selected service point by utilizing a table comprising service points allocated uniquely to the network servers (MSC1, MSC2) in the server pool (CNSP), in the table at least one of the network servers (MSC1, MSC2) having allocated at least two service points and one of the service points in the table being the selected service point identifying the first network server (MSC1); and
sending the message to the first network server (MSC1).

10. The method according to claim 9, wherein the temporary identity is included in the message from the mobile device (MS), further comprising the step of extracting the selected service point from the temporary identity.

11. The method according to claim 9, further comprising the step of receiving the selected service point from the mobile device (MS), the selected service point being extracted from the temporary identity by the mobile device (MS).

12. The method according to claim 9, wherein the controller (BSC2) of the access network (AN) is a base station controller or a radio network controller.

13. The method according to claim 9, wherein the mobile communication system is a global system for mobile communication or a universal mobile telecommunication system.

14. A method for sending a message from a mobile device (MS) to a first network server (MSC1) in a server pool (CNSP) of a mobile communication system, the mobile communication system having a controller (BSC2) of an access network (AN) connectable to the first network server (MSC1) and at least one further network server (MSC2) in the server pool (CNSP), wherein service points are defined and one or more of the service points are allocated uniquely to each of the network servers (MSC1, MSC2) in the server pool (CNSP), at least one of the network servers (MSC1, MSC2) having allocated at least two of the service points, the method comprising the steps of:
receiving a temporary identity including a selected service point being selected from the one or more service points allocated to the first network server (MSC1);
extracting the selected service point from the temporary identity; and
sending the selected service point to the controller (BSC2) for applying a routing algorithm for routing the message to the first network server (MSC1).

15. The method according to claim 14, wherein a number of service points in the server pool is defined by selecting a bit length (n) of a number block (SP) reserved for the service points in the temporary identity.

16. The method according to claim 14, wherein the service points are core network server pool service points or location area service points.

17. The method according to claim 14, wherein the network servers (MSC1, MSC2) in the server pool (CNSP) are mobile service switching centers or serving general packet radio service support nodes.

18. The method according to claim 14, wherein the temporary identity is a temporary mobile subscriber identity or a packet temporary mobile subscriber identity.

19. The method according to claim 14, wherein the controller (BSC2) of the access network (AN) is a base station controller or a radio network controller.

20. The method according to claim 14, wherein the mobile communication system is a global system for mobile communication or a universal mobile telecommunication system.

21. A mobile device (MS) suitable for sending a message to a first network server (MSC1) in a server pool (CNSP) of a mobile communication system, the mobile communication system having a controller (BSC2) of an access network (AN) connectable to the first network server (MSC1) and at least one further network server (MSC2) in the server pool (CNSP), wherein service points are defined and one or more of the service points are allocated uniquely to each of the network servers (MSC1, MSC2) in the server pool (CNSP), at least one of the network servers (MSC1, MSC2) having allocated at least two of the service points, the mobile device (MS) comprising:
means to receive a temporary identity including a selected service point being selected from the one or more service points allocated to the first network server (MSC1); and
means to extract the selected service point from the temporary identity, and to send the selected service point to the controller (BSC2) for applying a routing algorithm for routing the message to the first network server (MSC1).

22. An mobile communication system having a network server (MSC1) in a server pool (CNSP), the server pool having at least one further network server (MSC2), the network server (MSC1) being connectable to a controller (BSC2) of an access network (AN), the network server (MSC1) having allocated at least two service points that uniquely identify the network server (MSC1) in the server pool (CNSP), the mobile communication system further comprising:
- means for receiving a request for an assignment of a temporary identity for a mobile device (MS);
- means for assigning the temporary identity and including one selected service point being selected from the two or more service points allocated to the network server (MSC1) into the temporary identity; and
- means for sending the assigned temporary identity to the mobile device (MS).

23. The mobile communication system according to claim 22, further comprising means for re-allocating the service points to the network servers (MSC1, MSC2) in the server pool (CNSP).

24. The mobile communication system according to claim 23, wherein the service points are allocated depending on a load of at least one of the network servers (MSC1, MSC2) in the server pool (CNSP).

25. The mobile communication system according to claim 23, wherein the service points are allocated depending on a load of a link between the controller (BSC2) of the access network (AN) and one of the network servers (MSC1, MSG2) in the server pool (CNSP).

26. The mobile communication system according to claim 22, wherein the network server (MSC1) selects the selected service point.

27. The mobile communication system according to claim 22, wherein the temporary identity is assigned based on location information of the mobile device (MS).

28. The mobile communication system according to claim 22, wherein the controller (BSC2) of the access network (AN) is a base station controller or a radio network controller.

29. The mobile communication system according to claim 22, wherein the mobile communication system is a global system for mobile communication or a universal mobile telecommunication system.

* * * * *

UNITED STATES PATENT AND TRADEMARK OFFICE
CERTIFICATE OF CORRECTION

PATENT NO. : 7,526,301 B2  
APPLICATION NO. : 11/610347  
DATED : April 28, 2009  
INVENTOR(S) : Artola et al.

Page 1 of 2

It is certified that error appears in the above-identified patent and that said Letters Patent is hereby corrected as shown below:

On the Title Page, in the Figure, for Tag "S140", Line 1, delete "Points" and insert -- Point --, therefor.

In Fig. 1A, Sheet 1 of 9, for Tag "S140", Line 1, delete "Points" and insert -- Point --, therefor.

In Fig. 3A, Sheet 3 of 9, delete "Sever" and insert -- Server --, therefor.

In Fig. 3B, Sheet 3 of 9, delete "Sever" and insert -- Server --, therefor.

In Fig. 4A, Sheet 4 of 9, delete "Sever" and insert -- Server --, therefor.

In Fig. 4B, Sheet 5 of 9, delete "Sever" and insert -- Server --, therefor.

In Fig. 4B, Sheet 5 of 9, delete "Sever" and insert -- Server --, therefor.

In Fig. 5, Sheet 6 of 9, for Tag "T1", delete "Sever" and insert -- Server --, therefor.

In Fig. 5, Sheet 6 of 9, for Tag "T2", delete "Sever" and insert -- Server --, therefor.

In Fig. 5, Sheet 6 of 9, for Tag "T3", delete "Sever" and insert -- Server --, therefor.

In Fig. 7B, Sheet 9 of 9, delete " 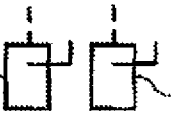 " and insert

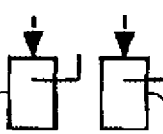 --, therefor.

Signed and Sealed this  
Twenty-fourth Day of April, 2012

David J. Kappos  
*Director of the United States Patent and Trademark Office*

CERTIFICATE OF CORRECTION (continued)
U.S. Pat. No. 7,526,301 B2

In Column 22, Line 8, in Claim 25, delete "MSG2)" and insert -- MSC2) --, therefor.